(12) United States Patent
Yamaguchi et al.

(10) Patent No.: US 7,465,325 B2
(45) Date of Patent: Dec. 16, 2008

(54) FUEL REFORMING SYSTEM AND WARMUP METHOD THEREOF

(75) Inventors: Koichi Yamaguchi, Yokohama (JP); Masatoshi Iio, Yokosuka (JP); Takao Izumi, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 641 days.

(21) Appl. No.: 10/510,850

(22) PCT Filed: Mar. 18, 2003

(86) PCT No.: PCT/JP03/03236

§ 371 (c)(1),
(2), (4) Date: Oct. 13, 2004

(87) PCT Pub. No.: WO03/086962

PCT Pub. Date: Oct. 23, 2003

(65) Prior Publication Data

US 2005/0175532 A1 Aug. 11, 2005

(30) Foreign Application Priority Data

Apr. 18, 2002 (JP) .............................. 2002-115897

(51) Int. Cl.
*B01J 8/00* (2006.01)
*C10L 3/00* (2006.01)
*C01B 3/36* (2006.01)
*H01M 8/18* (2006.01)
*F01N 3/20* (2006.01)
*G05D 23/00* (2006.01)

(52) U.S. Cl. .................. 48/127.9; 48/197 R; 48/127.7; 422/105; 422/109; 422/110; 429/20; 429/22

(58) Field of Classification Search ............... 48/127.9, 48/197 R; 422/105
See application file for complete search history.

(56) References Cited

U.S. PATENT DOCUMENTS

2002/0150800 A1 * 10/2002 Asou et al. ..................... 429/20

FOREIGN PATENT DOCUMENTS

| EP | 1 198 020 A2 | 4/2002 |
|---|---|---|
| JP | 5-115770 A | 5/1993 |
| JP | 7-267604 A | 2/1996 |
| JP | 9-255305 A | 9/1997 |
| JP | 2001-180908 | 7/2001 |
| WO | WO 01/92147 A1 | 12/2001 |
| WO | WO 02/16258 A1 * | 2/2002 |
| WO | W 02/23659 A | 3/2002 |

* cited by examiner

*Primary Examiner*—Walter D. Griffin
*Assistant Examiner*—Lessanework T Seifu
(74) *Attorney, Agent, or Firm*—McDermott Will & Emery LLP

(57) ABSTRACT

A fuel reforming system generates burnt gas by burning fuel and air in a burner (6) during system startup, and the temperatures of a reforming reactor (7) and carbon monoxide oxidizer (40) are raised by supplying the burnt gas to the reforming reactor (7) and carbon monoxide oxidizer (40). The temperature of the burnt gas produced by the burner (6) is increased according to the elapsed time from the beginning of the startup processing.

9 Claims, 21 Drawing Sheets

FUEL REFORMING SYSTEM AND WARMUP METHOD THEREOF

FIELD OF THE INVENTION

This invention relates to a fuel reforming system, and more particularly to a method of warming it.

BACKGROUND OF THE INVENTION

JP2001-180908A published by the Japanese Patent Office in 2001 discloses a fuel reforming system comprising a reforming reactor which generates hydrogen-rich reformate gas from a hydrocarbon fuel, water and air, a shift reactor and preferential oxidation reactor which remove carbon monoxide from the reformate gas, and a burner which supplies heat used for warmup to the reactors when the system starts up.

In this prior art technology, when the system starts up, fuel is first burnt in excess air, and the temperature of the reforming reactor is raised by passing the burnt gas into the reforming reactor. When the reforming reactor has warmed up, the combustion in the burner is changed over to excess fuel conditions to start the fuel reforming reaction in the reforming reactor, and the reformate gas produced is supplied together with air and burnt in the shift reactor and preferential oxidation reactor to raise the temperature of these reactors.

SUMMARY OF THE INVENTION

However, in this prior art technique, when the temperature rise of the reforming reactor is complete and the reforming reaction starts, the shift reactor and preferential oxidation reactor are still at nearly environmental temperature. Therefore, water vapor produced by the combustion condenses on the catalyst surface of these reactors. This may interfere with the oxidation of hydrogen or carbon monoxide, and delay the temperature rise of the reactors.

On the other hand, in the warmup method when hot burnt gas is supplied, the upstream reactor suffers an excessive temperature rise which may lead to deterioration of the reactor catalyst.

It is therefore an object of this invention to raise the temperatures of reactors rapidly to suitable operating levels without causing excessive temperature rise of the reactors.

In order to achieve above object, this invention provides a fuel reforming system, comprising a burner which produces burnt gas by burning fuel and air, a reforming reactor connected downstream of the burner which is raised in temperature by supplying the burnt gas in a startup processing, a carbon monoxide oxidizer connected downstream of the reforming reactor which is raised in temperature by supplying the burnt gas discharged from the reforming reactor in the startup processing, and a controller. The controller functions to raise a temperature of the burnt gas produced by the burner according to an elapsed time from a beginning of the startup processing when the system starts up.

The details as well as other features and advantages of this invention are set forth in the remainder of the specification and are shown in the accompanying drawings.

DESCRIPTION OF THE PREFERRED EMBODIMENTS

Embodiment 1

Figure 1:
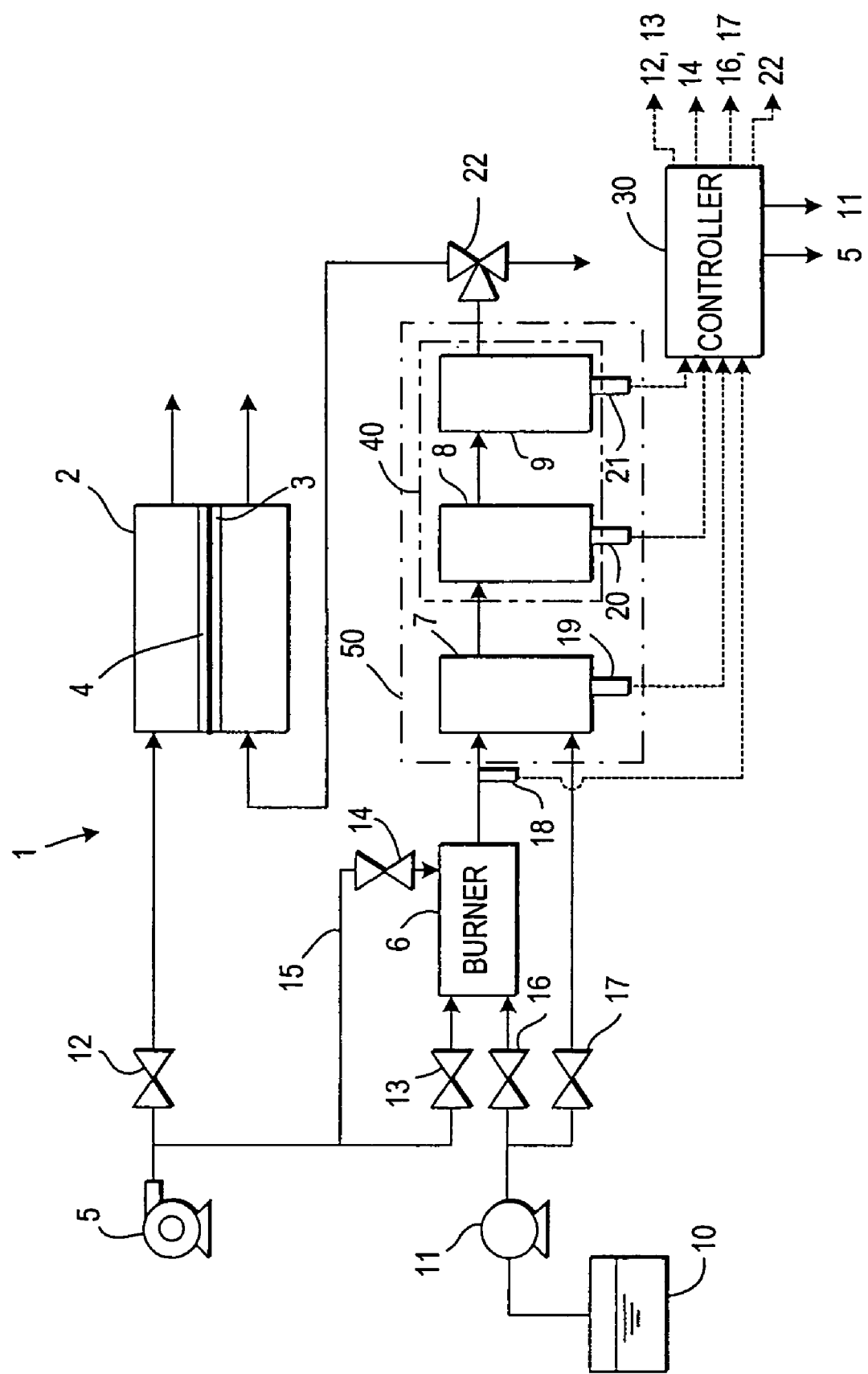
FIG. 1 is a schematic view of a fuel cell system provided with a fuel reforming system according to the present invention.

FIG. 1 of the drawings shows a fuel cell system 1 provided with a fuel reforming system according to this first embodiment. The fuel cell system 1 comprises a fuel cell 2 which generates power by an electrochemical reaction, and a reformer 50 which produces hydrogen-rich reformate gas by a reforming reaction and supplies this to the fuel cell 2, a compressor 5 which supplies air as an oxygen-containing gas to the fuel cell 2 and reformer 50, and a burner 6 which supplies burnt gas for warmup to the reformer 50 during system startup.

A hydrocarbon fuel such as gasoline and water, which are raw fuels for generating the reformate gas, are respectively stored in a fuel tank 10 and a water tank, not shown. The hydrocarbon fuel and water are respectively sent from the tanks to the reformer 50 by a fuel pump 11 and water pump, not shown.

The reformer 50 comprises a reforming reactor 7 and carbon monoxide oxidizer 40. The carbon monoxide oxidizer 40 comprises a shift reactor 8 and preferential oxidation (PROX) reactor 9.

The reforming reactor 7 mixes fuel, water and air supplied by the compressor 5, and produces hydrogen-rich reformate gas by a steam reforming reaction and partial oxidation reaction. The reforming reactor 7 is an autothermal type which compensates the heat required by the steam reforming reaction, which is an endothermic reaction, by the heat produced by the partial oxidation reaction which is an exothermic reaction.

The reformate gas supplied from the reforming reactor 7 to an anode 3 of the fuel cell 2 contains carbon monoxide, and to prevent poisoning of the fuel cell 2 by this carbon monoxide, the carbon monoxide concentration in the reformate gas must be sufficiently reduced. For this purpose, the shift reactor 8 which decreases the carbon monoxide concentration by a shift reaction and the preferential oxidation reactor 9 which reduces carbon monoxide by a preferential oxidation reaction, are installed between the reforming reactor 7 and fuel cell 2.

In general, the suitable operating temperatures of the reactors 7-9 are different, the respective temperatures being approximately 650-850° C. for the reforming reactor 7, approximately 240-380° C. for the shift reactor 8, and approximately 100-150° C. for the preferential oxidation reactor 9. The suitable operating temperature decreases more for the reactors situated downstream. Also, the heat capacity of the reactors 7-9 is largest for the shift reactor 8 and decreases in order for the preferential oxidation reactor 9 and reforming reactor 7.

Air is supplied from the compressor 5 to a cathode 4 of the fuel cell 2, and reformate gas from the reformer 50 is supplied to the anode 3. The fuel cell 2 generates power using an electrochemical reaction, which for example is used to drive an electric motor.

The burner 6 is installed upstream of the reformer 50. When the system starts up, fuel and air are supplied to the burner 6, and generate burnt gas for warmup of the reactors 7-9.

Figure 2:
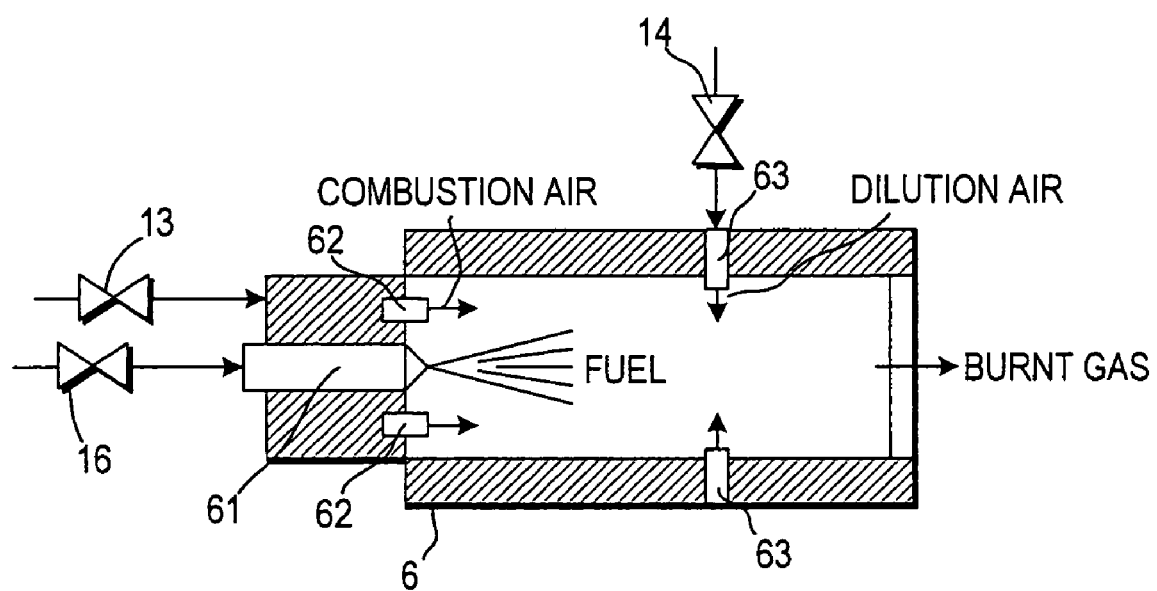
FIG. 2 is a schematic view of a burner.

FIG. 2 shows the construction of the burner 6. Fuel is injected from an injector 61 in the burner 6. Air supplied from the compressor 5 to the burner 6 is supplied separately as combustion air used for burning fuel which is led in from upstream ports 62, and diluting air for diluting burnt gas which is led in from downstream ports 63. The burnt gas discharged from the burner 6 flows through the reforming reactor 7, shift reactor 8 and preferential oxidation reactor 9 in that order, and raises the temperatures of the reactors 7-9 by heat exchange.

The controller 30 used for system control comprises one, two or more microprocessors, a memory and an input/output interface. Signals are input to the controller 30 from a sensor 18 which detects the temperature of the burnt gas produced by the burner 6 and supplied to the reformer 50, a sensor 19 which detects the gas temperature at the outlet of the reforming reactor 7, a sensor 20 which detects the gas temperature at the outlet of the shift reactor 8, and a sensor 21 which detects the gas temperature at the outlet of the preferential oxidation reactor 9.

Based on the detected temperatures, the controller 30 controls valves 16, 17 which adjust fuel flowrate supplied to the burner 6 and reforming reactor 7, a valve 12 which adjusts the air flowrate supplied to the fuel cell 2, a valve 13 which adjusts combustion air flowrate supplied to the burner 6, a valve 14 which adjusts the air flowrate for diluting the burnt gas, and a three-way valve 22 which controls gas discharged from the carbon monoxide oxidizer 40, which is burnt gas during startup and is reformate gas during reforming operation, so as to supply the fuel cell 2 or discharge to the atmosphere.

FIGS. 3A-3D show the temperature and flowrate of burnt gas supplied to the reformer 50, and the air and fuel flowrate supplied to the burner 6, during the startup processing.

Figure 3A:
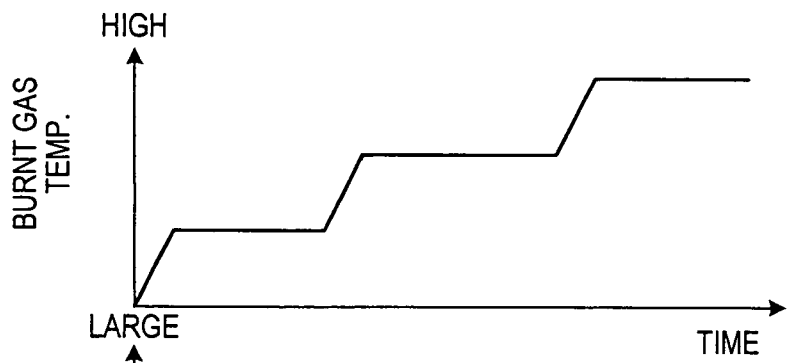
FIGS. 3A-3D are time charts showing the temperature and flowrate of the burnt gas supplied to the reactors, and the flowrate of air and fuel supplied to the burner, during a startup processing.
Figure 3B:
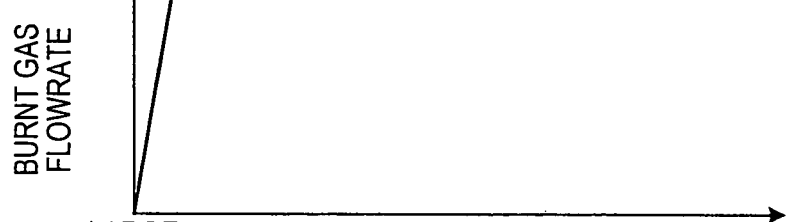
Figure 3C:
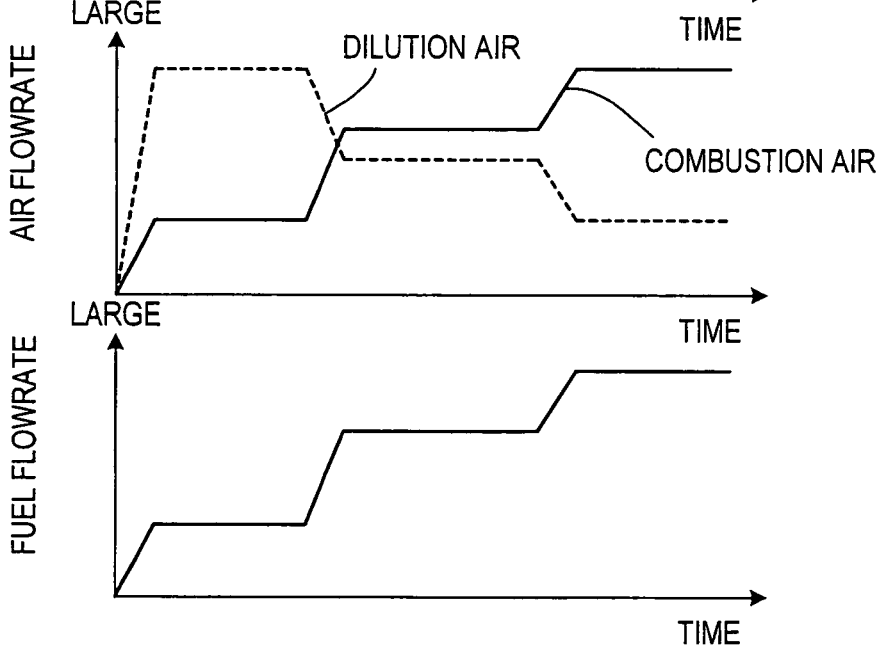
Figure 3D:
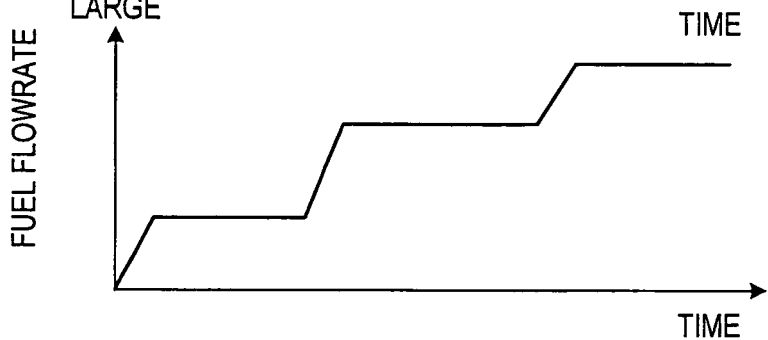

During the startup processing, the temperature of the burnt gas supplied to the reformer 50 rises in stages together with elapsed time from startup, as shown in FIG. 3A. The temperature rise of the burnt gas continues until warmup of the reactors 7-9 is complete. The temperature of the burnt gas is controlled by the fuel flowrate supplied to the burner 6. The air flowrate (=combustion air flowrate+dilution air flowrate) supplied to the burner 6 is maintained constant, and the proportion of combustion air and fuel is set to be substantially constant in terms of the excess air proportion, i.e., the combustion air flowrate increases together with increase of fuel flowrate.

The dilution air flowrate introduced from the ports 63 is set to a flowrate obtained by subtracting the combustion air flowrate from the fixed air flowrate supplied from the compressor 5. The air flowrate supplied to the burner 6 may be supplied entirely as combustion air flowrate, i.e., the combustion air flowrate may be fixed and dilution air flowrate may be zero, and the excess air factor made to decrease as the fuel flowrate in the burner 6 increases.

The startup processing of the reformer 50 will now be described in further detail.

Figure 4:
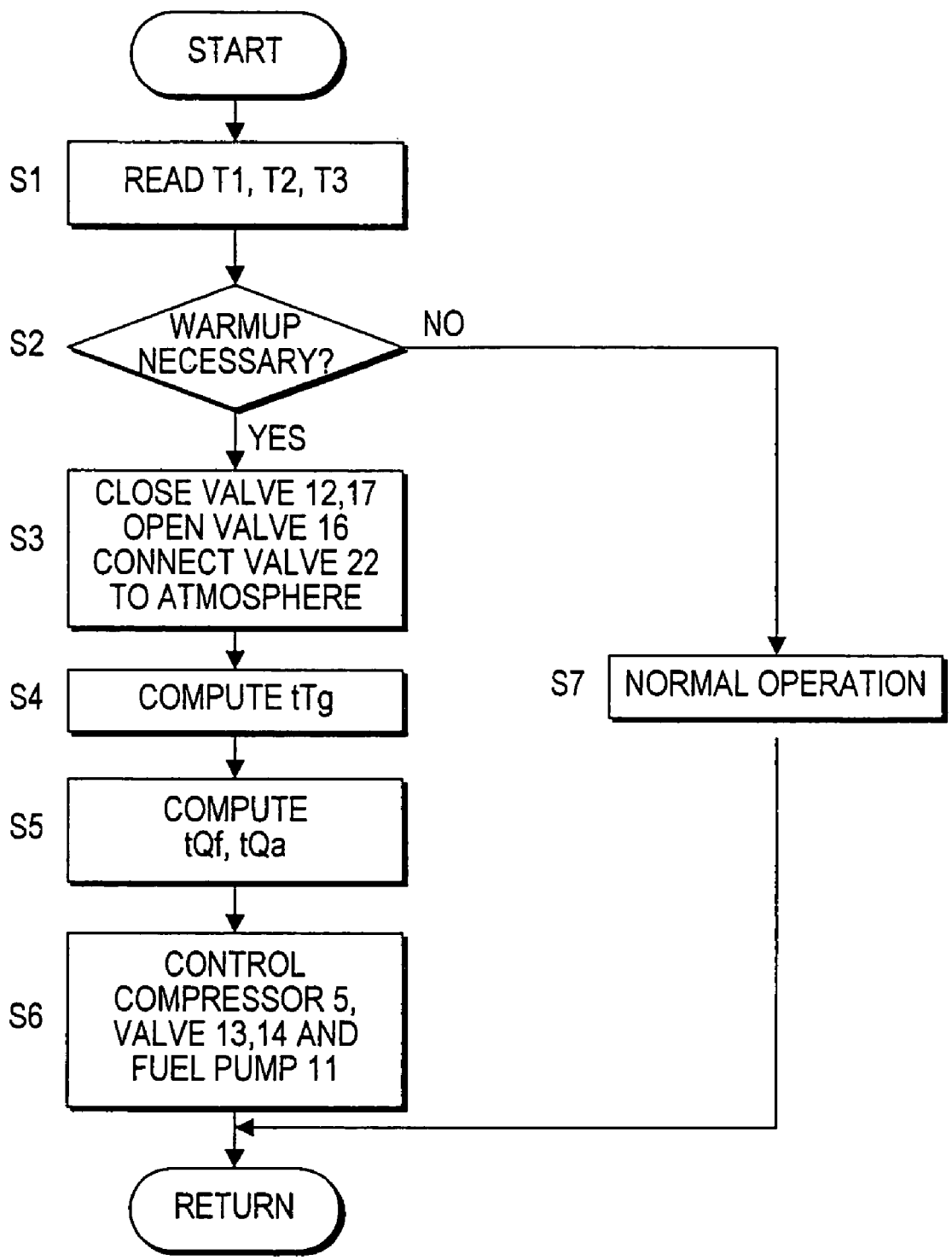
FIG. 4 is a flowchart showing the startup processing performed by a controller.

FIG. 4 is a flowchart showing the start-up processing of the reformer 50 performed by the controller 30, and is executed at a predetermined interval, for example 10 milliseconds.

In a step S1, a gas temperature T1 at the outlet of the reformer reactor 7, a gas temperature T2 at the outlet of the shift reactor 8 and a gas temperature T3 at the outlet of the preferential oxidation reactor 9, detected by the sensors 19, 20, 21, are read.

In a step S2, it is determined whether or not the gas temperatures T1, T2, T3 have reached the temperatures required for reforming operation set for each reactor. If any of these temperatures has not reached the set temperatures, it is determined that warmup is required, and the routine proceeds to a step S3. In all other cases, it is determined that warmup is not required, the routine proceeds to a step S7, and ordinary reforming operation is performed.

In the step S3, valves are adjusted to send air and fuel to the burner 6, and the downstream reformer 50 is connected to the atmosphere. Specifically, the valves 12, 17 are closed, and the valve 16 is opened. Also, the three-way valve 22 is connected to the atmosphere.

In a step S4, a target burnt gas temperature tTg is set.

Here, a heat amount Q transmitted from the burnt gas to the components of the reformer 50 is given by the following equation:

$$Q = h \cdot A \cdot (Tg - Tc)$$

h is the heat transmission efficiency, A is the surface area with which the components are in contact with the burnt gas, Tg is the burnt gas temperature, and Tc is the temperature of the components.

According to this, the heat amount transmitted from the burnt gas to the components is smaller, as temperature difference between the burnt gas and components is smaller. In other words, the heat amount taken from the burnt gas by the components is small, so the burnt gas may be supplied to the downstream reactor without reducing the temperature too much, and the temperature of the reactor situated downstream may be made to rise.

Figure 5:
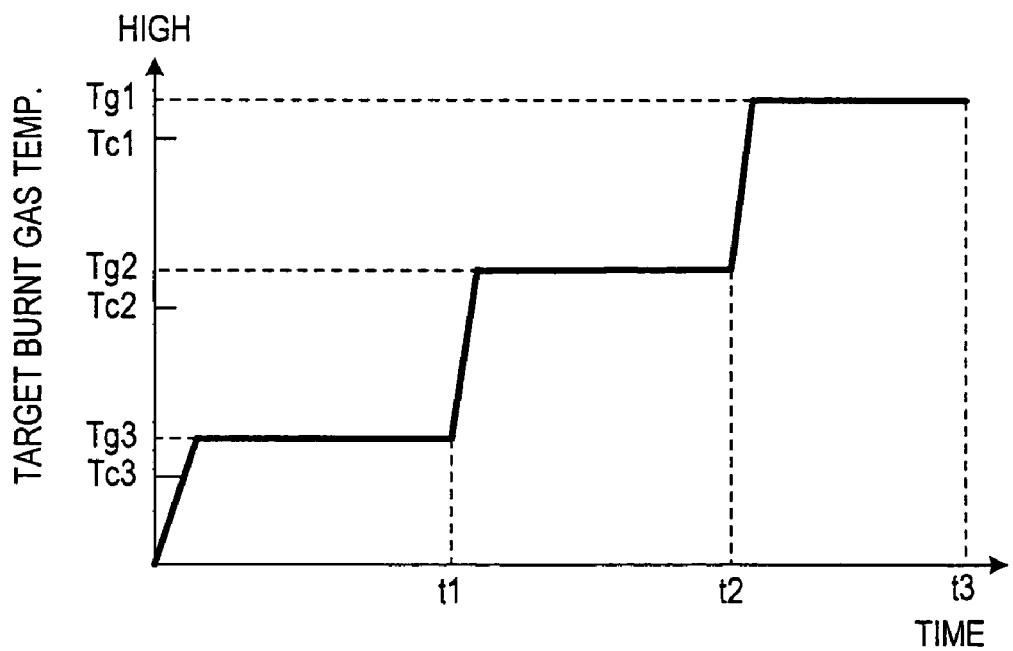
FIG. 5 is a table specifying a relation between an elapsed time from the beginning of the startup processing and a target burnt gas temperature.

The target burnt gas temperature Tg is set as follows, referring to the table of FIG. 5 according to the elapsed time from the beginning of the startup processing.

After the beginning of the startup processing to a time t1, the target burnt gas temperature tTg is set to a predetermined temperature Tg3 (e.g., approximately 200° C.) between a temperature Tc3 (approximately 100-150° C.) suitable for operation of the preferential oxidation reactor 9, and a temperature TC2 (approximately 240-380° C.) suitable for operation of the shift reactor 8. This suppresses the temperature difference between the reforming reactor 7, shift reactor 8 and burnt gas to be small, causes the burnt gas to flow to the preferential oxidation reactor 9 without much temperature drop, and causes the temperature of the preferential oxidation reactor 9 to rise.

From the time t1 to a time t2, the target burnt gas temperature tTg is set to a predetermined temperature Tg2 (e.g., approximately 500° C.) between the temperature Tc2 suitable for operation of the shift reactor 8 and a temperature. Tc1 (approximately 650-850° C.) suitable for operation of the reforming reactor 7. This is intended to increase the temperature difference between the reforming reactor 7, shift reactor 8 and burnt gas, and causes the temperatures of these reactors to rise. At this time, until the temperatures of the reforming reactor 7 and shift reactor 8 rise sufficiently, the sensible heat of the burnt gas is substantially removed due to heat exchange with the reforming reactor 7 and shift reactor 8, so the temperature of the preferential oxidation reactor 9 situated downstream does not rise excessively.

From the time t2 to a time t3, the target burnt gas temperature tTg is set to a predetermined temperature Tg1 (e.g., approximately 900° C.) higher than the temperature Tc1 suitable for operation of the reforming reactor 7 situated furthest upstream. This is intended to increase the temperature difference between the reforming reactor 7 and burnt gas, transmit the heat of the burnt gas to the reforming reactor 7, and further increase the temperature of the reforming reactor 7. Until the temperature of the reforming reactor 7 has been sufficiently increased, the sensible heat of the burnt gas is substantially removed due to heat exchange with the reforming reactor 7, so the temperatures of the shift reactor 8 and preferential oxidation reactor 9 situated downstream do not rise excessively.

In a step S5, a target fuel flowrate tQf and target air flowrate tQa are computed.

Figure 6:
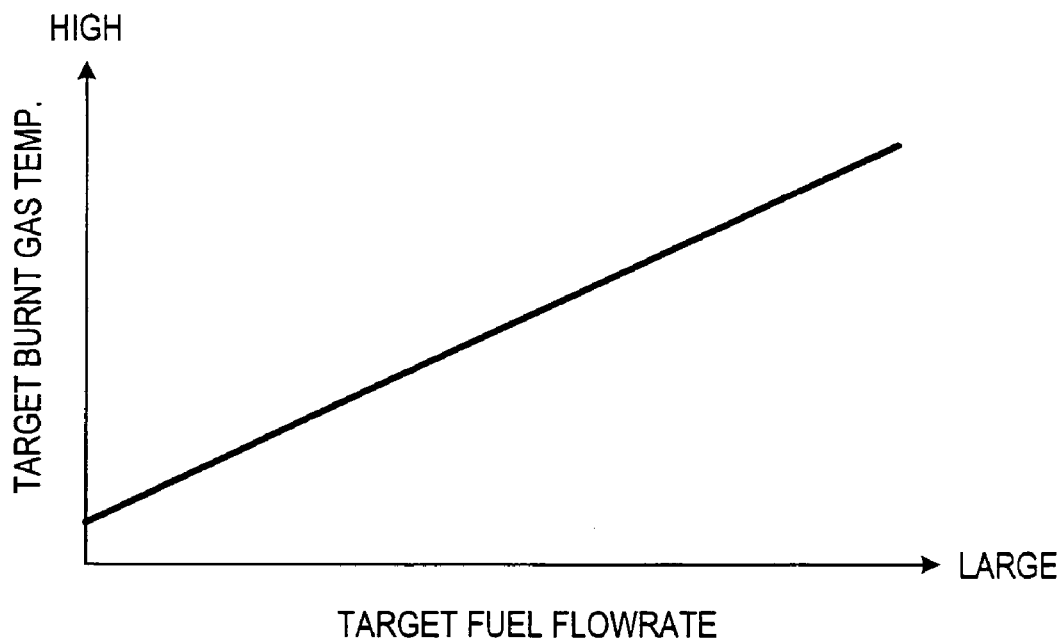
FIG. 6 is a table specifying a relation between a target fuel flowrate and the target burnt gas temperature.

The target fuel flowrate tQf is computed by looking up the table shown in FIG. 6 so that the burnt gas temperature Tg is equal to the target burnt gas temperature tTg.

The target air flowrate tQa is set to a constant value. The target air flowrate tQa is divided into a target combustion air flowrate tQa1 and target dilution air flowrate tQa2. The target combustion air flowrate tQa1 increases together with increase of the target fuel flowrate tQf, and is computed so that air is not excessive when mixed with fuel at the target fuel flowrate tQf. The target dilution air flowrate tQa2 is computed by subtracting the target combustion air flowrate tQa1 from the target air flowrate tQa.

In FIG. 6, the target burnt gas temperature tTg and target fuel flowrate tQf are in a linear relationship, however the relation shown in FIG. 6 may be corrected using the fuel flowrate actually supplied and the burnt gas temperature measured by the sensor 18.

In a step S6, the compressor 5, valves 13, 14 and fuel pump 11 are controlled so that the target fuel flowrate tQf, target air flowrate tQa, target combustion air flowrate tQa1 and target dilution air flowrate tQa2 are realized.

Next, the operation of this embodiment will be described.

When the startup processing begins, first, the temperature of the burnt gas supplied from the burner 6 to the reformer 50 is set substantially equal to the suitable operating temperature of the preferential oxidation reactor 9 situated furthest downstream in the reformer 50, and the whole of the reformer 50 is heated. In this way, the temperature of the preferential oxidation reactor 9 situated downstream is made to increase sufficiently.

Subsequently, the burnt gas temperature is raised to a suitable operating temperature of the shift reactor 8 situated in the middle in the reformer 50, and the temperatures of the reforming reactor 7 and shift reactor 8 are further increased. Until warmup of the shift reactor 8 is complete, the sensible heat of the burnt gas is effectively removed due to heat exchange with the reforming reactor 7 and shift reactor 8, so the temperature of the preferential oxidation reactor 9 situated downstream does not rise excessively due to the heat of the burnt gas.

Subsequently to this, the burnt gas temperature is raised to a suitable operating temperature of the reforming reactor 7 situated furthest upstream, and the temperature of the reforming reactor 7 is further increased. At this time, until warmup of the reforming reactor 7 is complete, the sensible heat of the burnt gas is substantially removed due to heat exchange with the reforming reactor 7, so the temperatures of the shift rector 8 and preferential oxidation reactor 9 situated downstream do not rise excessively due to the heat of the burnt gas.

Figure 7:
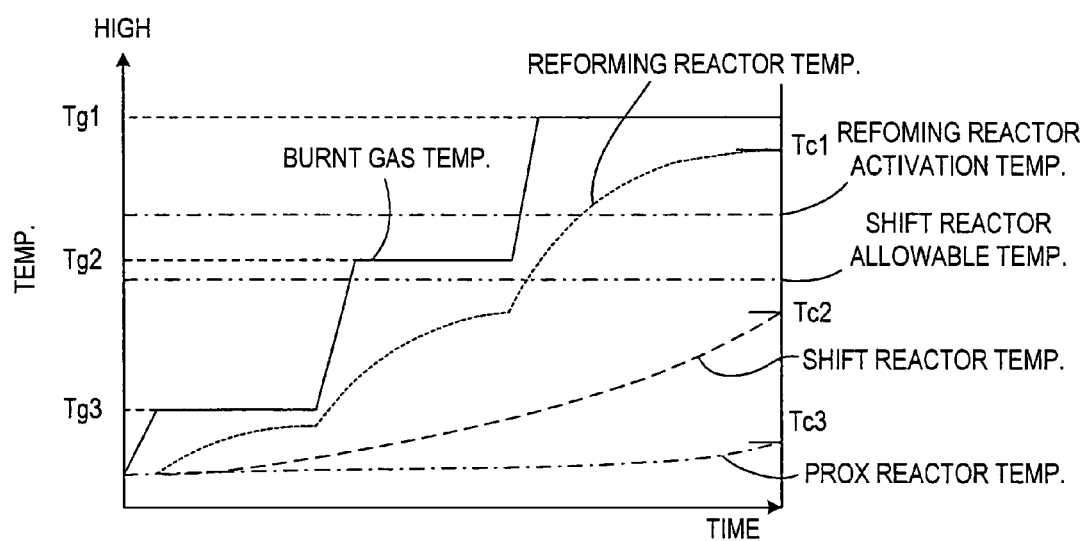
FIG. 7 is a time chart showing the temperature variation of the burnt gas and temperature variation of the reactors during the startup processing.

FIG. 7 shows the temperature variation of the burnt gas and temperature variation of the reactors 7-9 during the startup processing.

When warmup of the reforming reactor 7 is complete (right-hand side of FIG. 7), the reforming reactor 7, shift reactor 8 and preferential oxidation reactor 9 are respectively raised to approximately 650-850° C., approximately 240-380° C., and approximately 100-150° C. which are suitable for operation without excessively increasing their temperatures.

By raising the temperature of the burnt gas supplied to the reformer 50 according to the elapsed time from the beginning of the startup processing, the temperatures of reactors can be raised to suitable operating values progressively from the reactor situated downstream without increasing the complexity of the system and causing an excessive rise of reactor temperatures.

The temperature of the burnt gas supplied to the reformer 50 is controlled by adjusting the fuel flowrate supplied to the burner 6, so burnt gas temperature control is easy.

During the startup processing, the air flowrate (combustion air flowrate and dilution air flowrate) to the burner 6 is fixed, the fuel flowrate to the burner 6 is increased with the time from startup, and the temperature of the burnt gas supplied to the reformer 50 is increased according to the time from the beginning of the startup processing, so the reactors 7, 8, 9 of the reformer 50 can be raised to their suitable operating temperatures.

If all the air supplied to the burner 6 is combustion air, i.e., if the combustion air flowrate is fixed, the dilution air flowrate is zero, and the air excess factor is decreased as the fuel flowrate in the burner 6 increases, the fuel flowrate need not be set too low at the beginning of the startup processing, so the start-up time is not excessively delayed. As a result, the reactors 7, 8, 9 can be raised to their suitable temperatures in a short time without impairing their durability.

The target burnt gas temperature tTg may be computed based on the gas temperatures at the outlet of the reactors 7, 8 or 9 detected by the sensors 19, 20 or 21. In this case, in the step S4, the target burnt gas temperature tTg is set based on the detected reactor outlet gas temperature by looking up the table shown in FIG. 8 instead of the table shown in FIG. 5. In the table shown in FIG. 8, the target burnt gas temperature increases in stages as the detected reactor outlet gas temperature rises.

The reactor outlet gas temperature is preferably the gas temperature at the outlet of the preferential oxidation reactor 9 detected by the sensor 21, or the gas temperature at the outlet of the shift reactor 8 detected by the sensor 20.

If the burnt gas temperature is raised according to the temperature of the gas discharged from the preferential oxidation reactor 9, after the preferential oxidation reactor 9, which does not easily show a temperature rise due to its downstream position in the reformer 50, and reaches a suitable operating temperature, the burnt gas can be raised to temperatures suitable for increasing the temperatures of the reactors 7, 8, so the reactors 7, 8, 9 can be raised to their suitable operating temperatures (e.g., catalyst activation temperatures).

When the burnt gas temperature is raised according to the temperature of the gas discharged from the shift reactor 8, after the shift reactor 8 has reached a suitable operating temperature, the burnt gas temperature can be increased to a temperature suited to temperature increase of the upstream reforming reactor 7.

Figure 8:
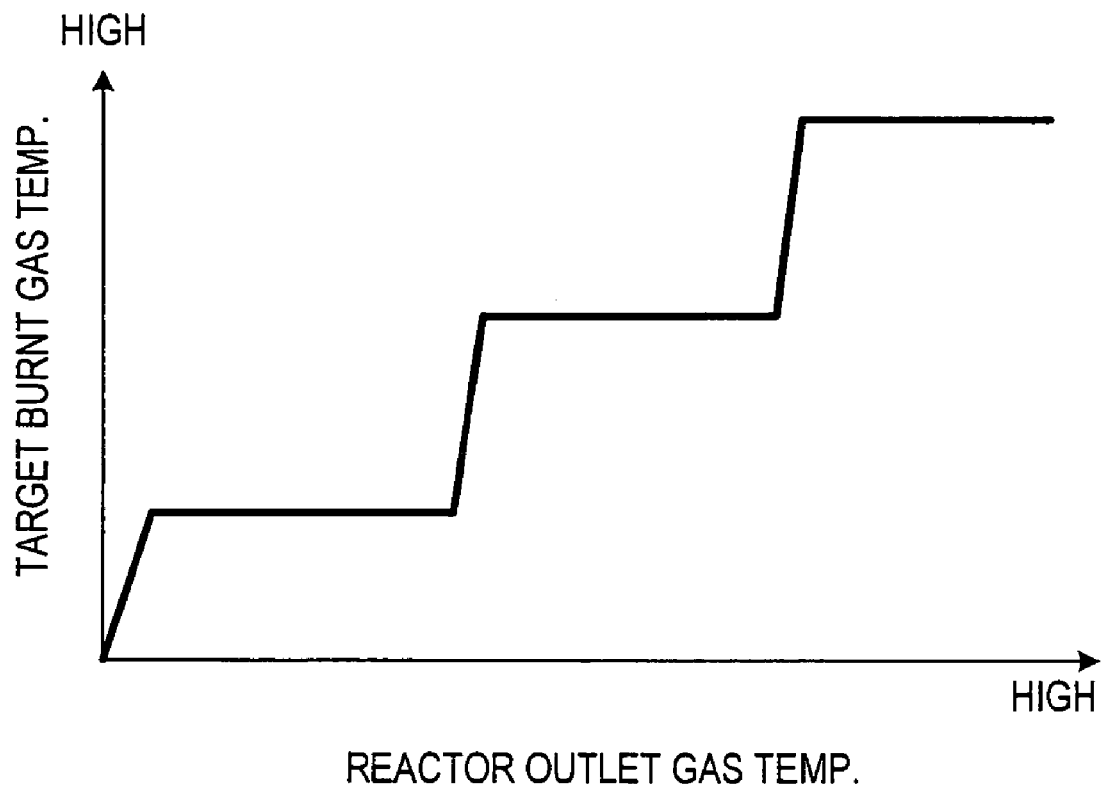
FIG. 8 is a table specifying a relation between reformate gas temperature at the reactor outlet and the target burnt gas temperature.
Figure 9A:
FIGS. 9A-9D are similar to FIG. 3A-3D, but describing a modification of the first embodiment.
Figure 9B:
Figure 9C:
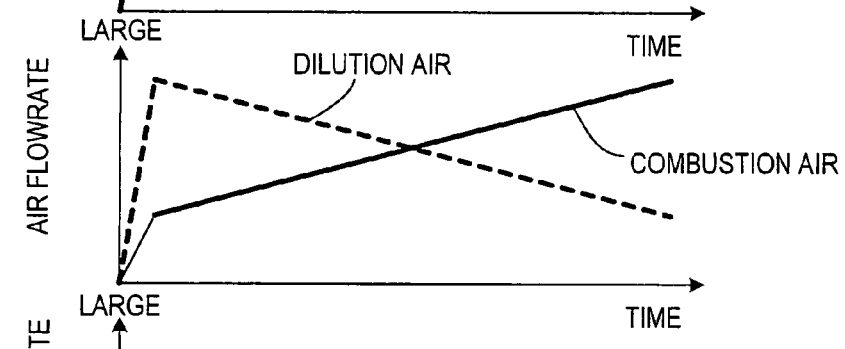
Figure 9D:
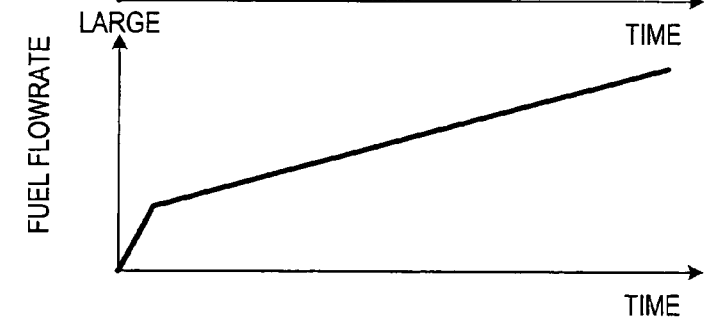

The temperature of the preferential oxidation reactor 9 is generally lower than the temperature of the shift reactor 8 except immediately after the beginning of the startup processing, so the value from the vertical axis of FIG. 8 is different depending whether the detected value is measured by the sensor 20 or the sensor 21, but the overall features shown in FIG. 8 are identical.

The temperature of the burnt gas supplied from the burner 6 to the reformer 50 may also be varied continuously as shown in FIGS. 9A-9D, instead of in stages.

Embodiment 2

A second embodiment will now be described. The construction of the fuel reforming system of the second embodiment is identical to that of the first embodiment except for the control by the controller 30.

Figure 10:
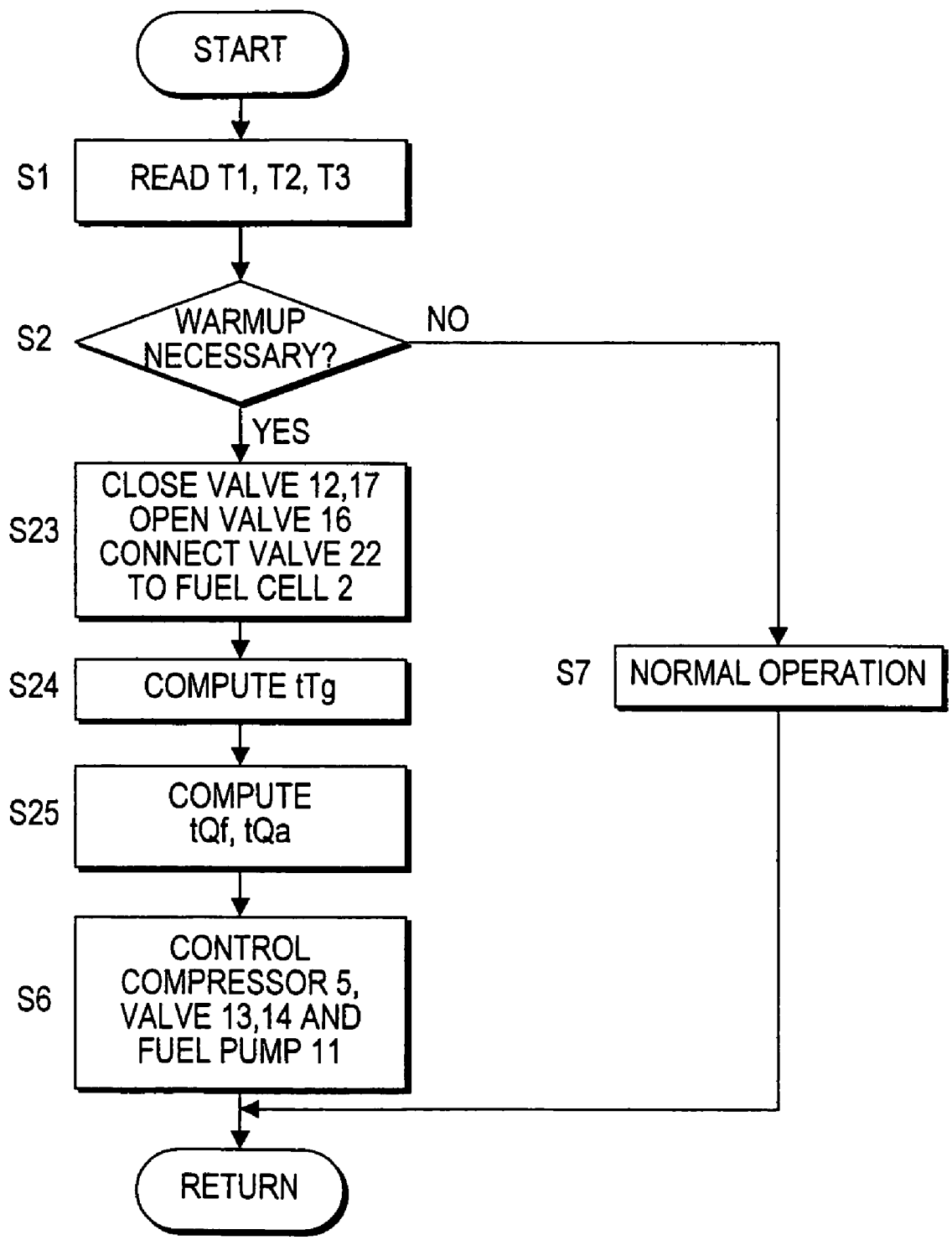
FIG. 10 is similar to FIG. 4, but showing a flowchart showing the startup processing performed by the controller in a second embodiment of this invention.

FIG. 10 shows the startup processing by the controller 30, and is performed instead of the processing shown in FIG. 4. The following description will focus on the differences from the first embodiment.

In the processing shown in FIG. 10, the steps S23-S25 are performed instead of the steps S3-S5 of FIG. 4.

In the step S23, the valve openings are adjusted to send air and fuel to the burner 6, and the downstream of the reformer 50 is connected to the fuel cell 2. Specifically, the valves 12, 17 are closed, the valve 16 is opened, and the three-way valve 22 is connected to the fuel cell 2.

Figure 11:
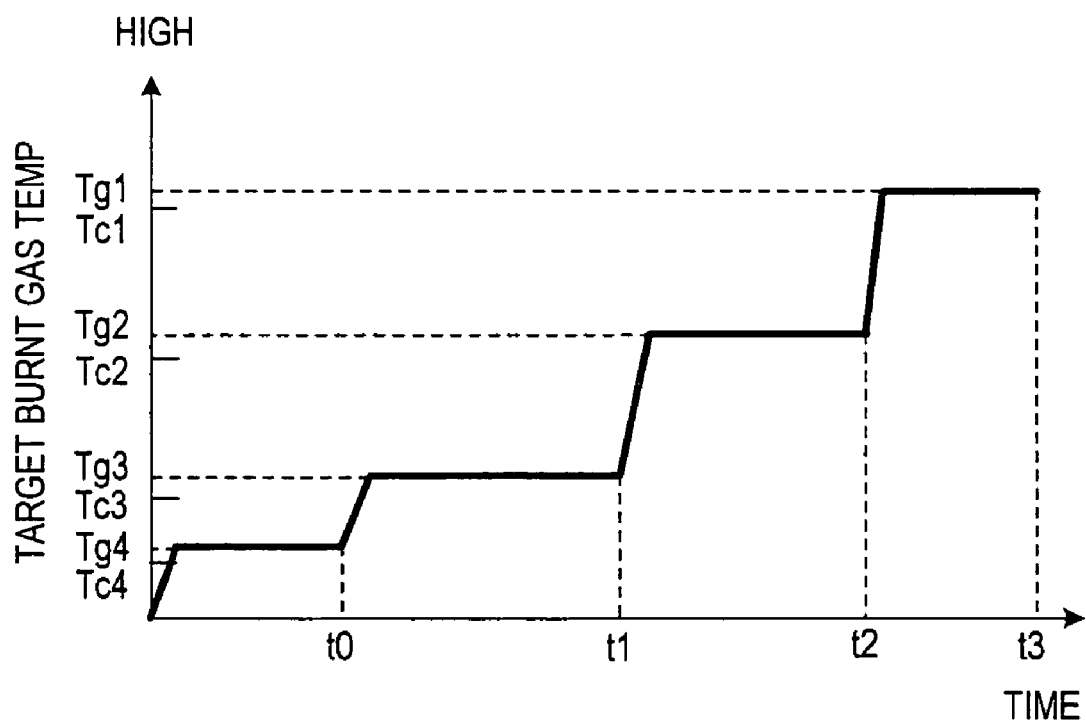
FIG. 11 is a table specifying a relation between an elapsed time from the beginning of the startup processing and the target burnt gas temperature.

In the step S24, the target burnt gas temperature tTg is computed based on the elapsed time from the beginning of the startup processing by looking up the table shown in FIG. 11.

In the second embodiment, to increase the temperature of the fuel cell 2 and the reformer 50 simultaneously, from the beginning of startup to a time t0, the target burnt gas temperature tTg is set to a temperature Tg4 (e.g., approximately 100° C.) between a temperature Tc4 (approximately 80° C.) suitable for operation of the fuel cell 2 and the temperature Tc3 suitable for operation of the preferential oxidation reactor 9.

Subsequently, the procedure is identical insofar as the target burnt gas temperature tTg is raised to the temperatures suitable for operation of the preferential oxidation reactor 9, shift reactor 8 and reforming reactor 7 in stages according to the elapsed time from the beginning of the startup processing.

Figure 12:
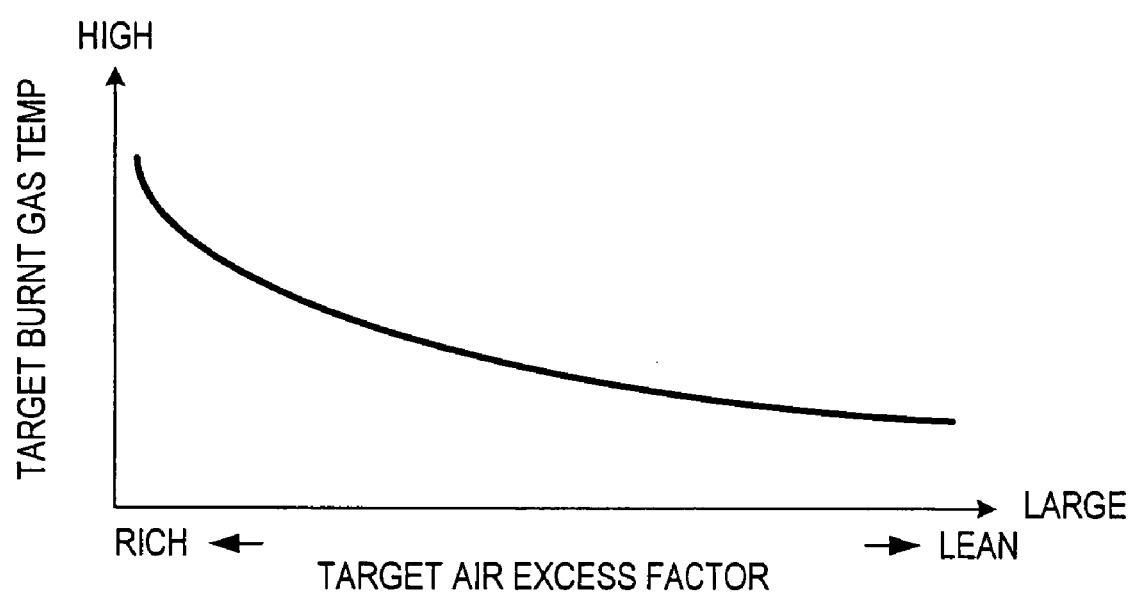
FIG. 12 is a table specifying a relation between a target air excess factor and target burnt gas temperature.
Figure 13A:
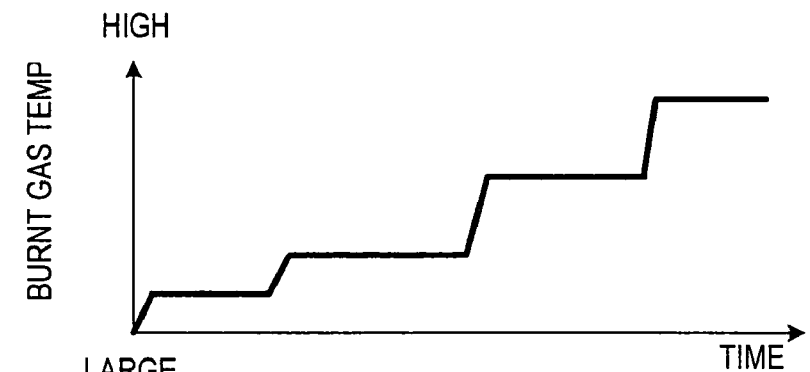
FIGS. 13A-13D are similar to FIGS. 3A-3D, but are time charts showing the temperature and flowrate of the burnt gas supplied to the reactors, at the air and fuel flowrates supplied to the burner, during the startup processing according to the second embodiment.
Figure 13B:
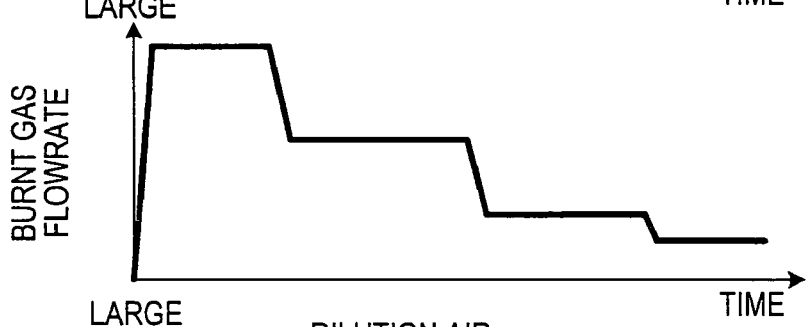
Figure 13C:
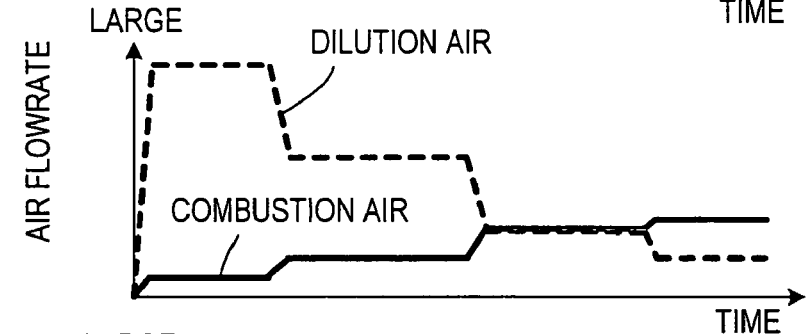
Figure 13D:
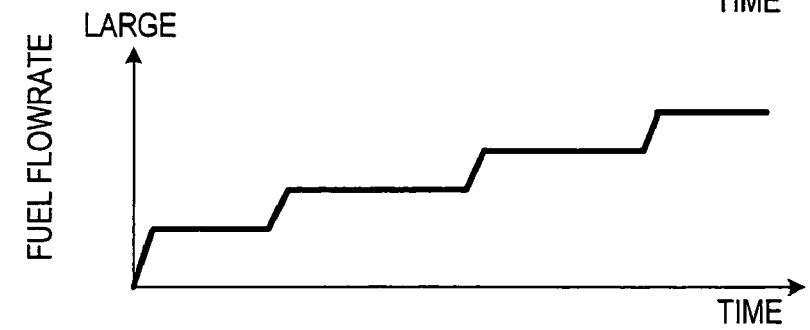

In the step S24, a target air excess factor tλ is computed based on the target burnt gas temperature tTg by looking up a table shown in FIG. 12. The table shown in FIG. 12 may be corrected based on the actual burnt gas temperature measured by the sensor 18.

In the step S25, the target fuel flowrate tQf, target air flowrate tQa (target combustion air flowrate tQa1, target dilution air flowrate tQa2) are computed.

The target burnt gas temperature tTg increases with the elapsed time, and correspondingly, the target air excess factor tλ decreases with the elapsed time, so the target fuel flowrate tQf is set to increase as the target excess factor tλ decreases. Further, according to the first embodiment, the target air flowrate tQa is a fixed value, but according to the second embodiment, it is set to decrease as the target air excess factor tλ decreases.

The target air flowrate tQa is divided into the target combustion air flowrate tQa1 and target dilution air flowrate tQa2. The target combustion air flowrate tQa1 increases together with elapsed time, and is computed so that the target excess factor tλ is realized. The target dilution air flowrate tQa2 is computed by subtracting the target combustion air flowrate tQa1 from the target air flowrate tQa.

FIGS. 13A-13D show the temperature and flowrate supplied to the reformer 50, and the air and fuel flowrate supplied to the burner 6, during the startup processing. The second embodiment is different from the first embodiment in that the air flowrate (the sum of the combustion air flowrate and dilution air flowrate) is decreased according to the elapsed time from the beginning of startup, and thus the burnt gas temperature is increased according to the elapsed time from the beginning of startup.

Figure 14:
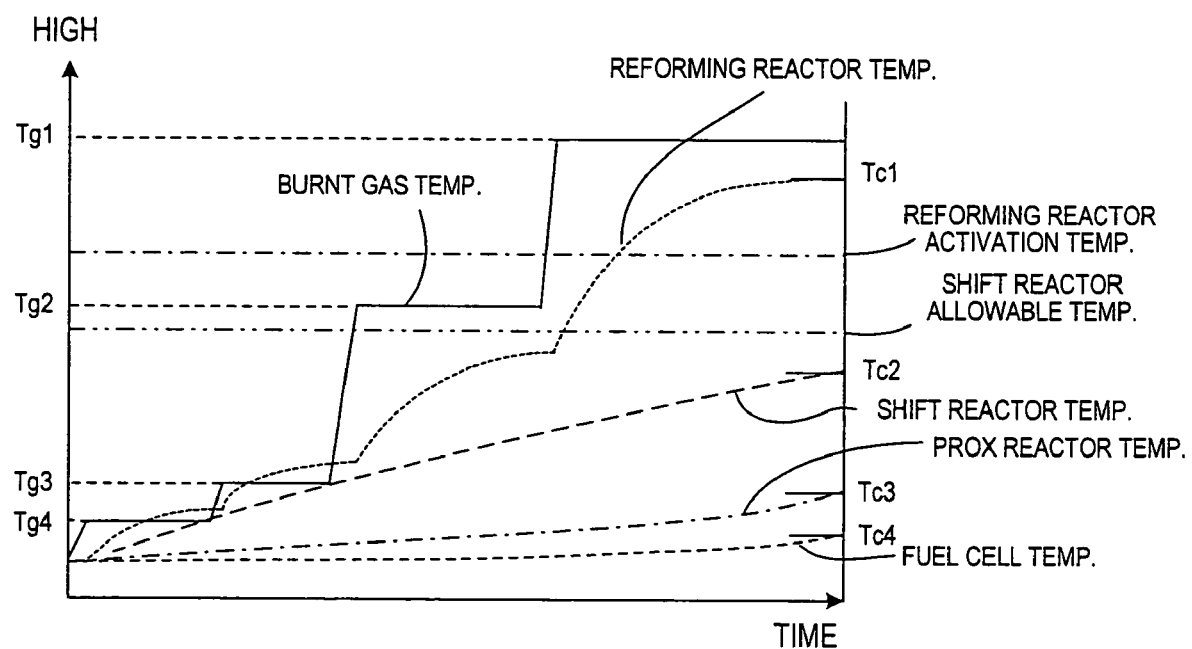
FIG. 14 is similar to FIG. 7, but is a time chart showing a temperature variation of the burnt gas, temperature variation of the reactors and temperature variation of the fuel cell during the startup processing, according to the second embodiment.

FIG. 14 shows the temperature variation of the burnt gas, temperature variation of the reactors 7-9 and temperature variation of the fuel cell 2 during the startup processing. In the second embodiment, the temperature of the fuel cell 2 is simultaneously increased together with the reactors 7-9. Also, the burnt gas temperature is increased in stages according to the elapsed time, so both the fuel cell 2 and reactors 7-9 can be raised to their suitable temperatures.

Figure 15:
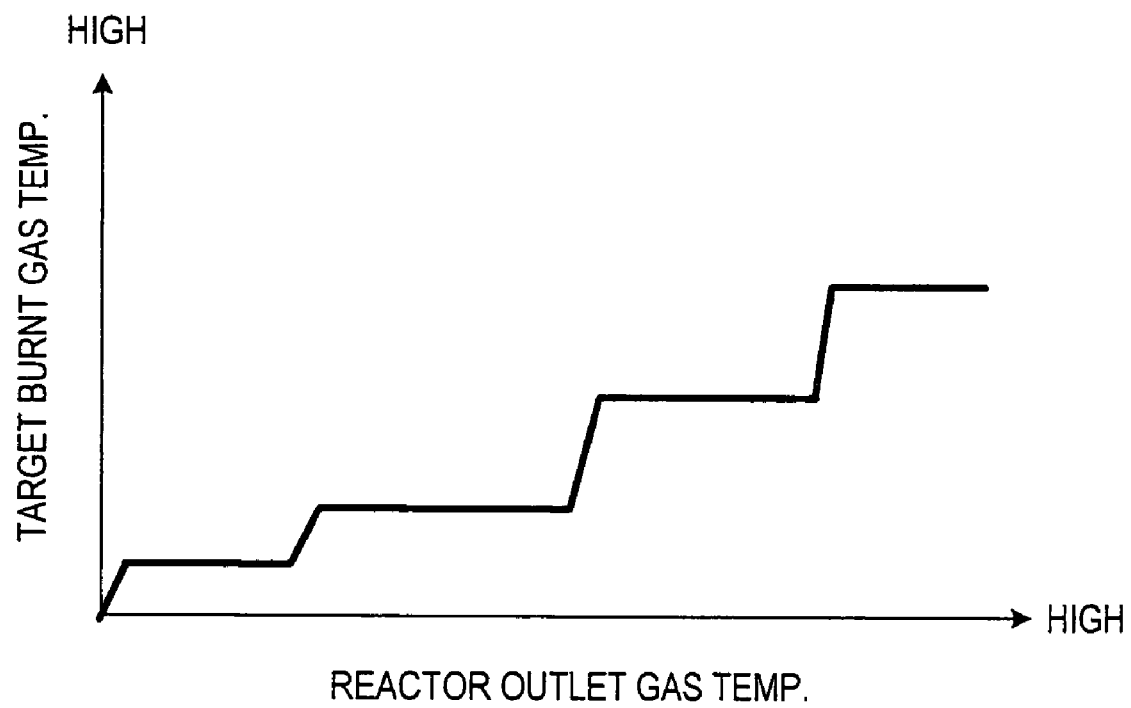
FIG. 15 is a table showing a relation between a reformate gas temperature at the reactor outlet and a target burnt gas temperature.
Figure 16A:
FIGS. 16A-16D are similar to FIGS. 13A-13D, but are time charts describing a modification of the second embodiment.
Figure 16B:
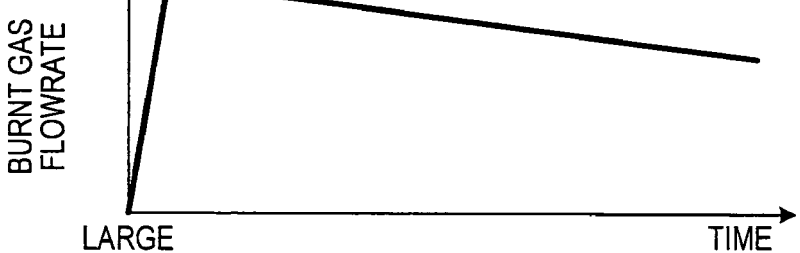
Figure 16C:
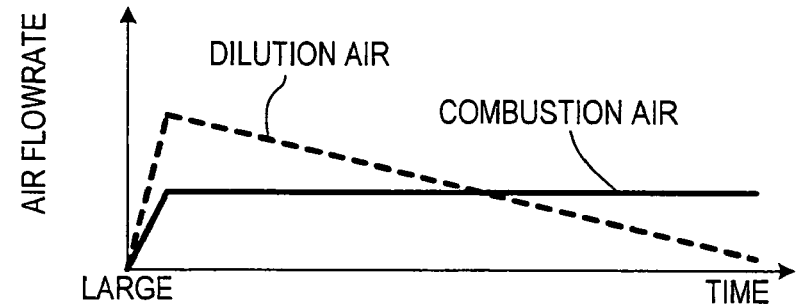
Figure 16D:
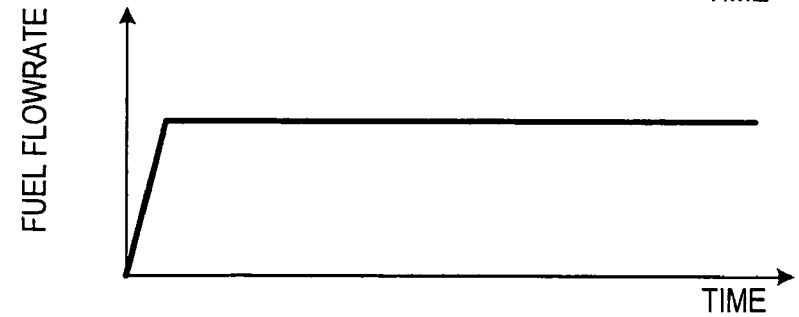

The temperatures of the gases discharged from the reactors 7-9 can also be detected by the sensors 19, 20, 21, and the target burnt gas temperature tTg computed by looking up a table shown in FIG. 15 based on the gas temperature detected by the sensor 20 or 21.

The temperature of the burnt gas supplied from the burner 6 to the reformer 50 may also be gradually varied as shown in FIGS. 16A-16D instead of varying it in stages.

According to the second embodiment, immediately after the beginning of startup, the temperature of the burnt gas supplied from the burner 6 to the reformer 50 is substantially equal to the suitable operating temperature of the fuel cell 2, and the burnt gas flowing through the reformer 50 is supplied to the fuel cell 2, so the reformer 50 and fuel cell 2 can simultaneously be raised in temperature.

Embodiment 3

A third embodiment will now be described.

Figure 17:
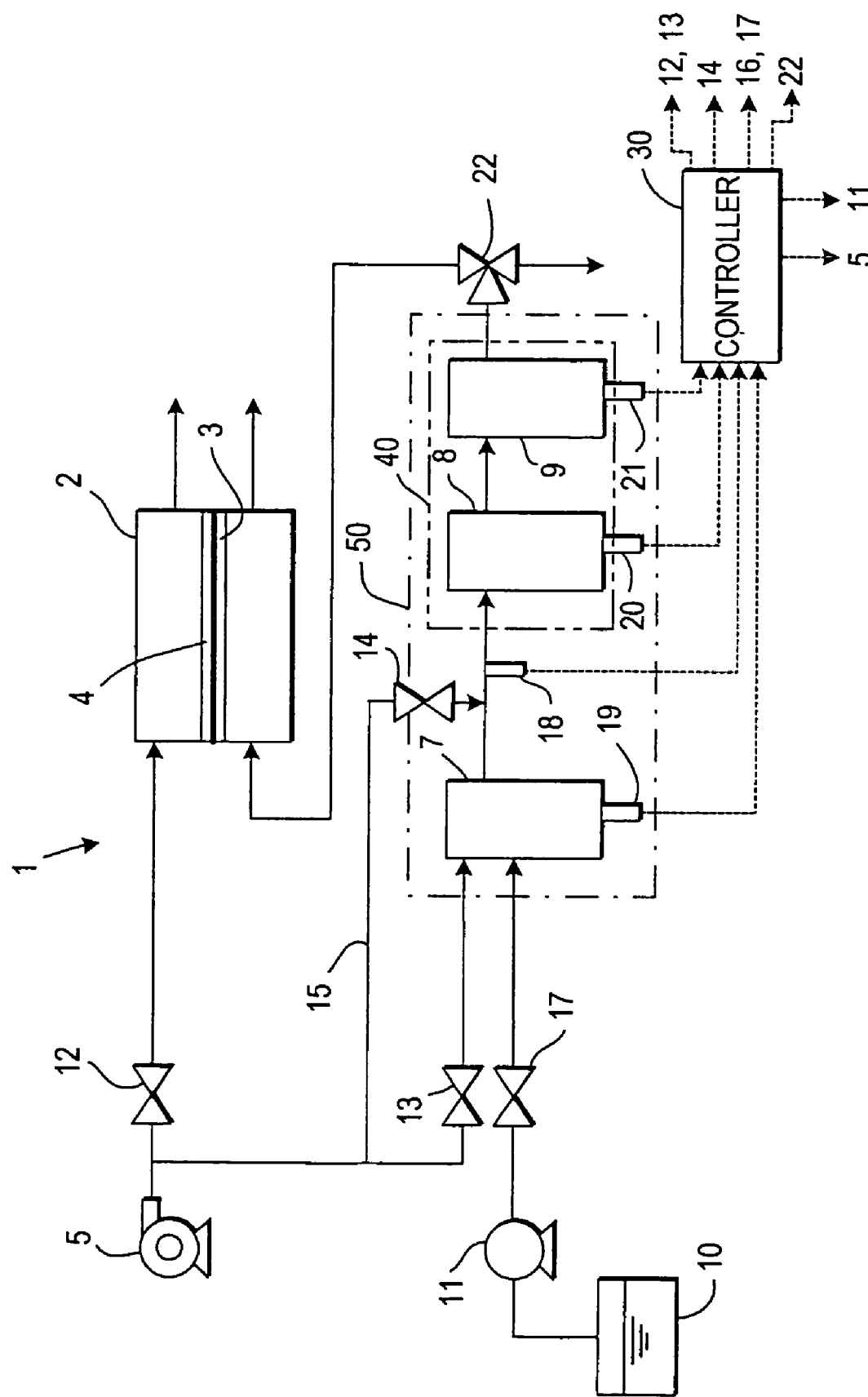
FIG. 17 is similar to FIG. 1, but showing a third embodiment of this invention.

The differences of the third embodiment from the first embodiment are that the burner 6 is omitted as shown in FIG. 17, and the burnt gas supplied to the reformer 50 during the startup processing is produced using the catalyst of the reforming reactor 7. The temperature of the burnt gas is controlled by controlling the dilution air flowrate introduced downstream of the reforming reactor 7. An air introduction passage is connected to a passage between the reforming reactor 7 and the shift reactor 8 to perform fuel reforming operation after the startup processing is completed, and this is used as a dilution air introduction passage 15.

Figure 18:
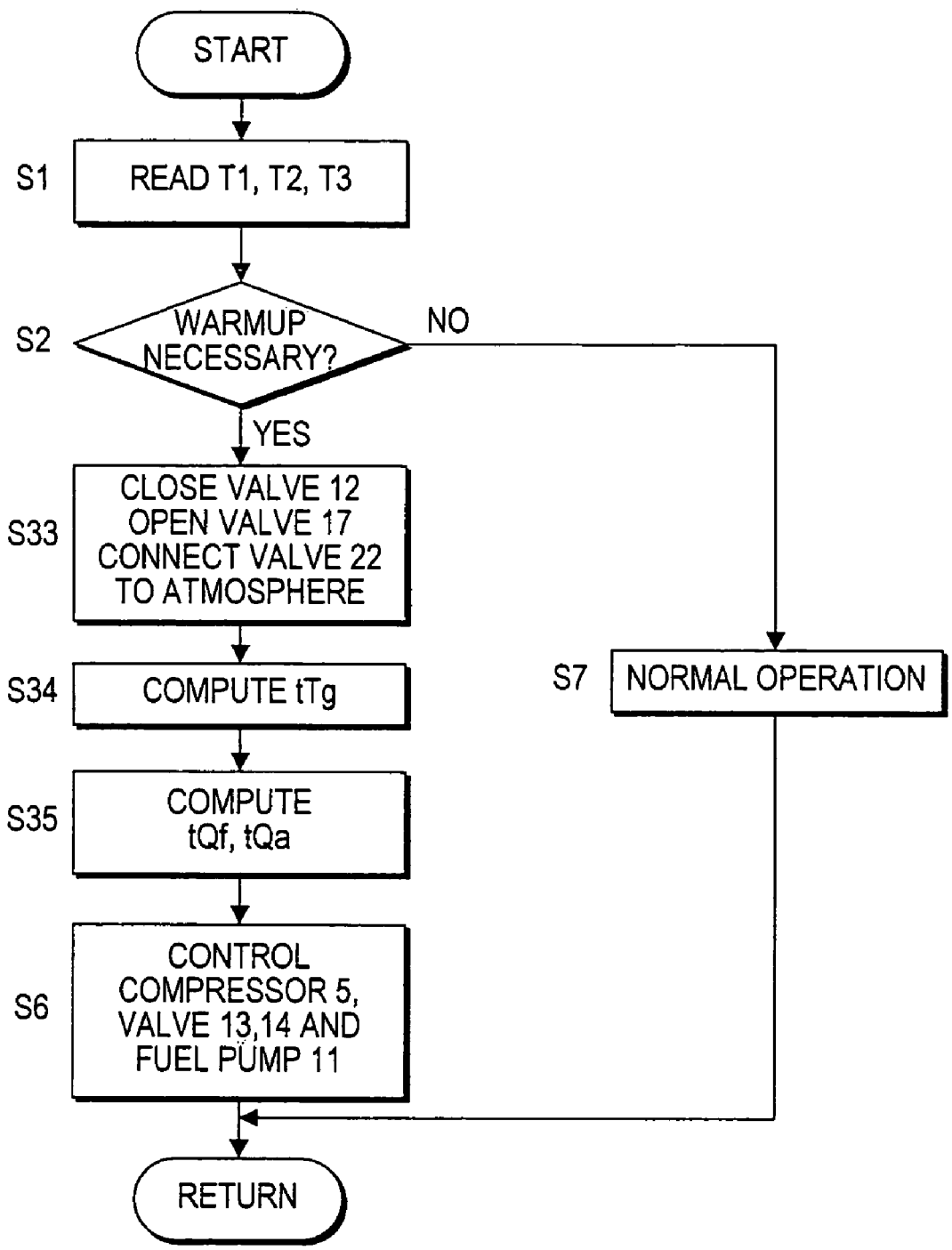
FIG. 18 is similar to FIG. 4, but is a flowchart showing the startup processing performed by the controller according to the third embodiment.

FIG. 18 shows the startup processing of the controller 30, and is performed instead of the processing shown in FIG. 4. The following description will focus on the differences from the first embodiment. In the processing shown in FIG. 18, steps S33-S35 are performed instead of the steps S3-S5 of FIG. 4.

In the step S33, valve openings are adjusted to send air and fuel to the reforming reactor 7, and the downstream of the reformer 50 is connected to the atmosphere. Specifically, the valve 12 is closed, the valve 17 is opened, and the three-way valve 22 is connected to the atmosphere.

Figure 19:
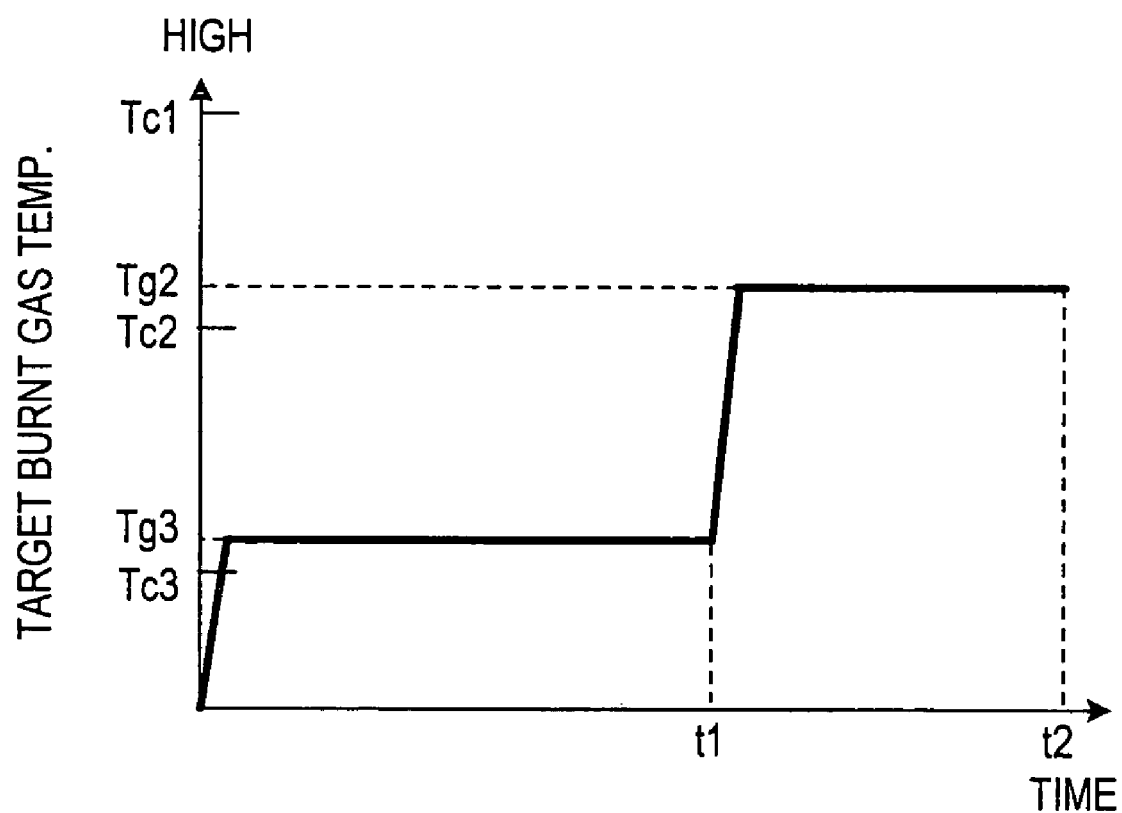
FIG. 19 is a table showing a relation between an elapsed time from the beginning of the startup processing at the target burnt gas temperature.

In the step S34, the target burnt gas temperature tTg is computed by looking up a table shown in FIG. 19. The target burnt gas temperature tTg is computed to increase in stages according to the elapsed time from the beginning of startup.

From the beginning of startup to the time t1, the target burnt gas temperature tTg is set to the temperature Tg3 between the temperature Tc3 suitable for operation of the preferential oxidation reactor 9, and the temperature Tc2 suitable for operation of the shift reactor 8. From the time t1 to the time t2, the target burnt gas temperature tTg is set to the temperature Tg2 between the temperature Tc2 suitable for operation of the shift reactor 8, and the temperature Tc1 suitable for operation of the reforming reactor 7.

Figure 20:
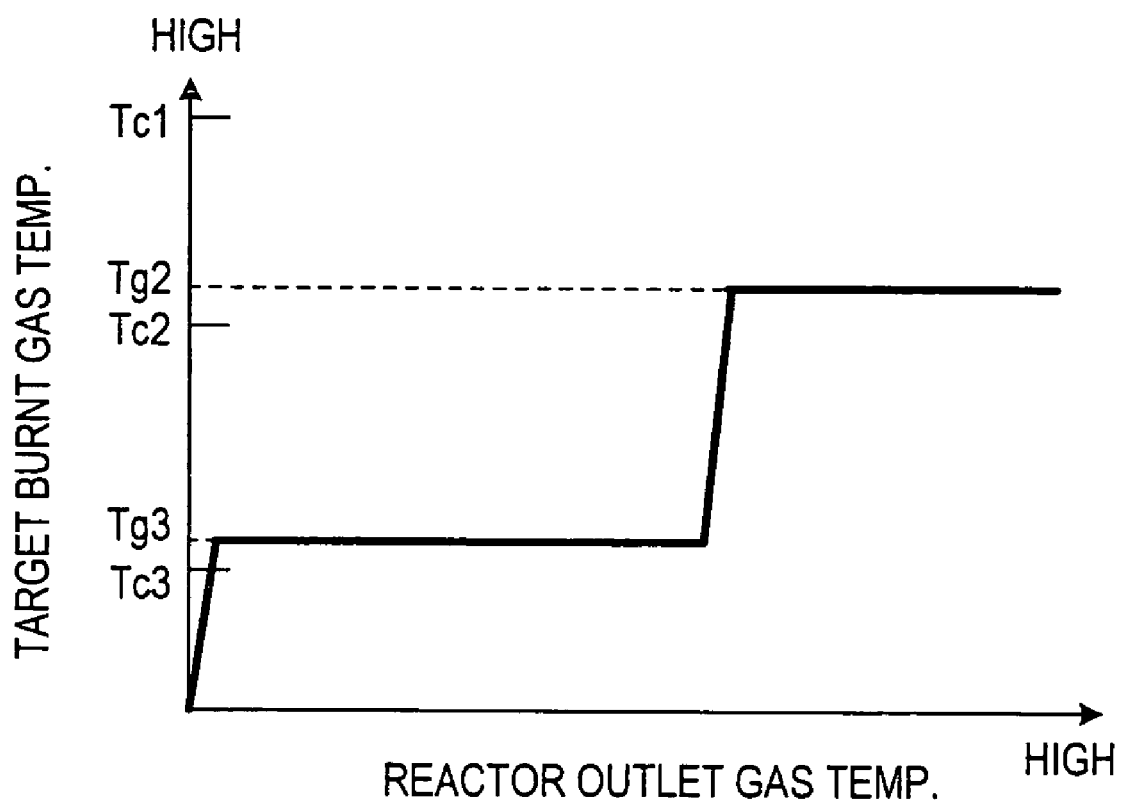
FIG. 20 is a table showing a relation between reformate gas temperature at the reactor outlet and target burnt gas temperature.
Figure 21A:
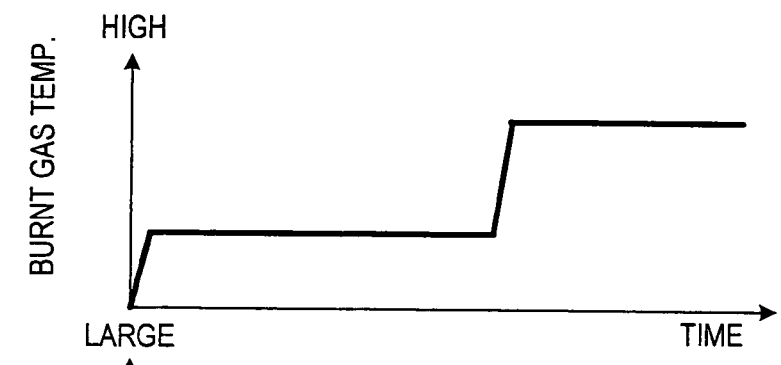
FIGS. 21A-21D are similar to FIGS. 3A-3D, but are time charts showing the temperature and flowrate of burnt gas supplied to the reactors, and the air and fuel flowrates supplied to the reformer used as a burner, during the startup processing of the third embodiment.
Figure 21B:
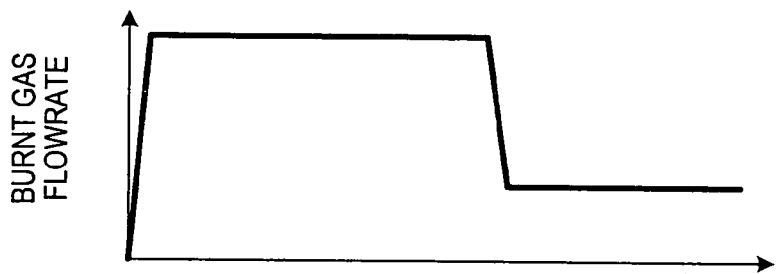
Figure 21C:
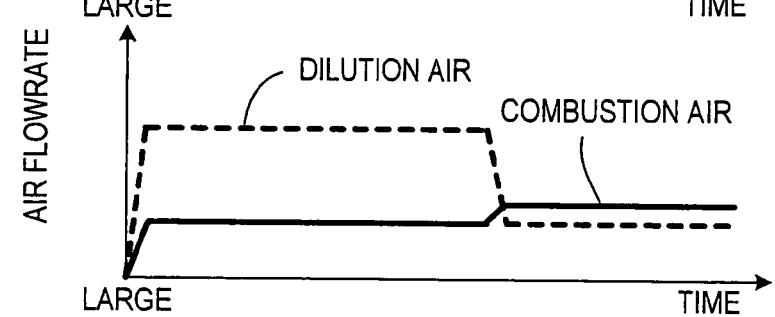
Figure 21D:
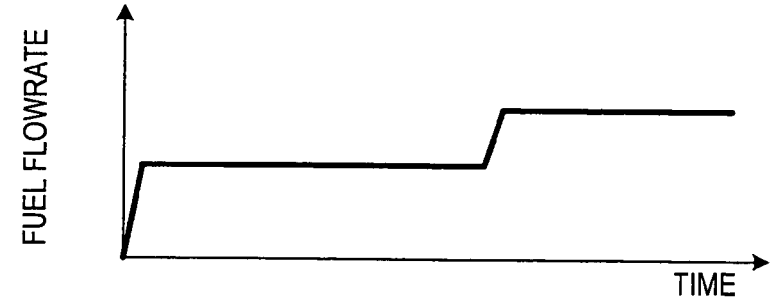

The target burnt gas temperature tTg may also be computed by looking up a table shown in FIG. 20 based on the gas temperature at the outlet of the reactors 8 or 9, as in the other embodiments.

In the step S35, the target fuel flowrate tQf and target air flowrate tQa (target combustion air flowrate tQa1, target dilution air flowrate tQa2) are computed so as to realize the target burnt gas temperature tTg.

The target burnt gas temperature tTg is set to be higher as the elapsed time increases, so the target fuel flowrate tQf is set to increase together with the elapsed time.

According to the third embodiment, the burnt gas temperature is controlled by controlling the dilution air flowrate introduced downstream of the reforming reactor 7, so the target dilution air flowrate tQa2 is computed to decrease together with the elapsed time. The target combustion air flowrate tQa1 is computed to increase as the target fuel flowrate tQf increases. The target air flowrate tQa is a value obtained by summing the target combustion air flowrate tQa1 and target dilution air flowrate tQa2, and decreases together with the elapsed time.

Figure 22:
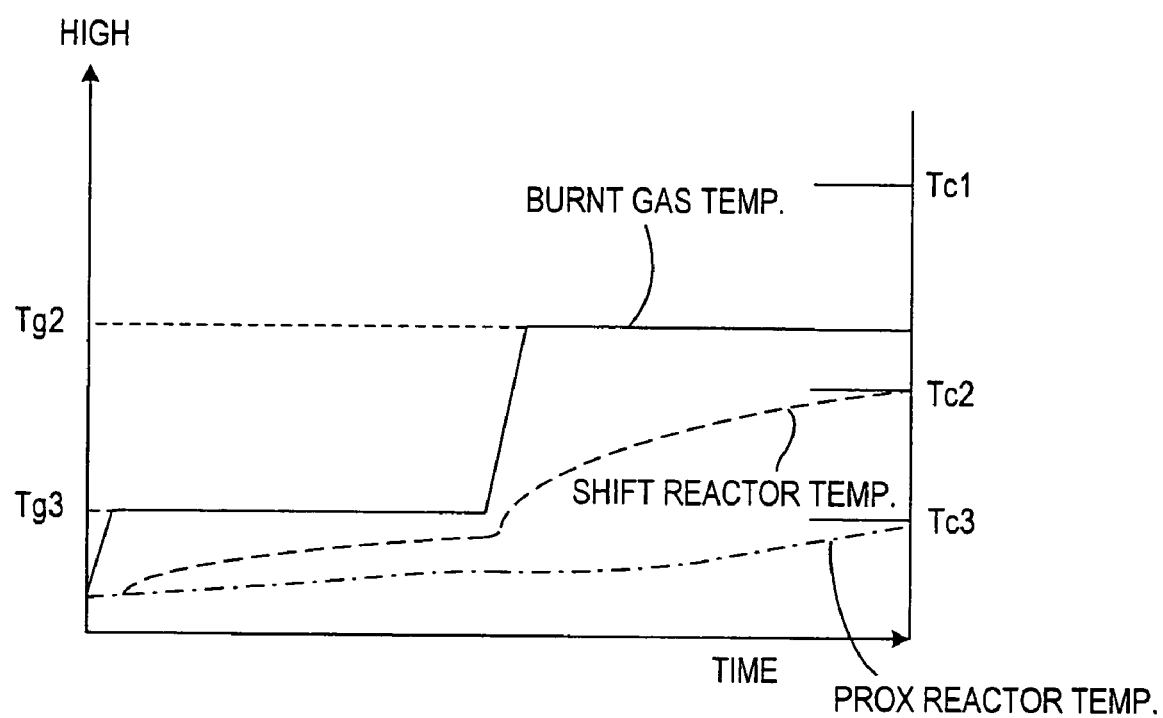
FIG. 22 is similar to FIG. 7, but is a time chart showing the temperature variation of burnt gas and temperature variation of the reactors during the startup processing according to the third embodiment.

FIGS. 21A-21D show the temperature of the burnt gas supplied to the reformer 50, and air and fuel flowrates supplied to the reforming reactor 7 which is used as a burner, during the startup processing. FIG. 22 shows the temperature variation of the burnt gas, and the temperature variations of the reactors 8, 9, during the startup processing. According to the third embodiment, the shift reactor 8 and preferential oxidation reactor 9 are respectively raised to suitable operating temperatures without excessively increasing their temperature.

The burnt gas is produced by using the catalyst of the reforming reactor 7 during the startup processing, so the burner 6 is unnecessary, and the system construction can be simplified. Also, the burnt gas temperature can be controlled by adjusting the dilution air flowrate supplied downstream of the reforming reactor 7, so the burnt gas temperature can be controlled easily.

The air introduction passage for reforming operation connected to the passage between the reforming reactor 7 and the shift reactor 8, can be used as the dilution air introduction passage 15, so there is no need to provide a new air introduction passage for the startup processing, and the system construction can be simplified.

As described above, according to this invention, the temperature of the burnt gas supplied to the reformer 50 is raised according to the elapsed time from the beginning of startup, so the reactors 7, 8, 9 of the reformer 50 can respectively be raised to suitable operating temperatures without excessively increasing their temperatures, and the reforming system can be started in a short time.

In the aforesaid embodiments, the reformer 50 comprises the reforming reactor 7, shift reactor 8 and preferential oxidation reactor 9, but the reformer 50 may have a different construction.

The entire contents of Japanese Patent Application P2002-115897 (filed Apr. 18, 2002) are incorporated herein by reference.

Although the invention has been described above by reference to certain embodiments of the invention, the invention is not limited to the embodiments described above. Modifications and variations of the embodiments described above will occur to those skilled in the art, in the light of the above teachings. The scope of the invention is defined with reference to the following claims.

INDUSTRIAL FIELD OF APPLICATION

This invention may be applied to a fuel reforming system. The plural reactors forming the fuel reforming system can respectively be raised to suitable operating temperatures without excessive temperature increase, so startup time can be shortened without decreasing the durability of the fuel reforming system.

The invention claimed is:
1. A fuel reforming system, comprising:
  a burner which produces burnt gas by burning fuel and air,
  a reforming reactor connected downstream of the burner which is raised in temperature by supplying the burnt gas in a startup processing, a carbon monoxide oxidizer connected downstream of the reforming reactor which is raised in temperature by supplying the burnt gas discharged from the reforming reactor in the startup processing, and a controller functioning to:

raise a temperature of the burnt gas produced by the burner, in stages, according to an elapsed time from a beginning of the startup processing when the system starts up, wherein:

the controller functions to first raise the temperature of the burnt gas produced by the burner to a suitable operating temperature of the carbon monoxide oxidizer, and then raise the temperature of the burnt gas produced by the burner to a suitable operating temperature of the reforming reactor.

2. The fuel reforming system as defined in claim 1, wherein:

the controller further functions to raise the temperature of the burnt gas produced by the burner by decreasing the ratio of the air to the fuel supplied to the burner.

3. The fuel reforming system as defined in claim 2, further comprising:

an air amount adjuster which adjusts an air amount supplied to the burner, and a fuel amount adjuster which adjusts a fuel amount supplied to the burner, and the controller further functions to raise the temperature of the burnt gas produced by the burner by controlling the air amount adjuster to fix the air amount supplied to the burner, and controlling the fuel amount adjuster so that the fuel amount supplied to the burner increases.

4. The fuel reforming system as defined in claim 1, wherein:

the carbon monoxide oxidizer comprises a preferential oxidation reactor which decreases the carbon monoxide concentration by a preferential oxidation reaction, the system further comprises a sensor which detects a temperature of a gas discharged by the preferential oxidation reactor, and the controller further functions to raise the temperature of the burnt gas produced by the burner according to increase of the detected gas temperature.

5. The fuel reforming system as defined in claim 1, wherein:

the carbon monoxide oxidizer comprises a shift reactor which decreases the carbon monoxide concentration by a shift reaction, the system further comprises a sensor which detects a temperature of a gas discharged by the shift reactor, and the controller further functions to raise the temperature of the burnt gas produced by the burner according to an increase of the detected gas temperature.

6. The fuel reforming system defined in claim 1, wherein:

the reformer doubles as the burner, and produces the burnt gas by burning fuel and air.

7. The fuel reforming system as defined in claim 1, further comprising:

a supply device which controls supply of the burnt gas discharged by the carbon monoxide oxidizer to a fuel cell, and the controller further functions to control the supply device so that the burnt gas discharged by the carbon monoxide oxidizer is supplied to the fuel cell.

8. A warmup method of a fuel reforming system, the system including a burner, a reforming reactor connected downstream of the burner and a carbon monoxide oxidizer connected downstream of the reforming reactor, the method comprising:

producing burnt gas by burning fuel and air by the burner, supplying the burnt gas to the reforming reactor, supplying the burnt gas discharged from the reforming reactor to the carbon monoxide oxidizer, and raising a temperature of the burnt gas produced by the burner, in stages, according to an elapsed time from a beginning of a startup processing of the system, wherein:

a controller functions to first raise the temperature of the burnt gas produced by the burner to a suitable operating temperature of the carbon monoxide oxidizer, and then raise the temperature of the burnt gas produced by the burner to a suitable operating temperature of the reforming reactor.

9. A fuel reforming system, comprising:

a burner which produces burnt gas by burning fuel and air, a reforming reactor connected downstream of the burner which is raised in temperature by supplying the burnt gas in a startup processing, a carbon monoxide oxidizer connected downstream of the reforming reactor which is raised in temperature by supplying the burnt gas discharged from the reforming reactor in the startup processing, and means for raising a temperature of the burnt gas produced by the burner, in stages, according to an elapsed time from a beginning of the startup processing when the system starts up, wherein:

a controller functions to first raise the temperature of the burnt gas produced by the burner to a suitable operating temperature of the carbon monoxide oxidizer, and then raise the temperature of the burnt gas produced by the burner to a suitable operating temperature of the reforming reactor.

* * * * *